United States Patent
Kobayashi et al.

(10) Patent No.: US 7,131,830 B2
(45) Date of Patent: Nov. 7, 2006

(54) BLOW MOLDING MACHINE

(75) Inventors: Hiromitsu Kobayashi, Nagano-ken (JP); Masahiro Miyashita, Nagano-ken (JP); Hidetoshi Tatebe, Nagano-ken (JP); Makoto Kifune, Nagano-ken (JP)

(73) Assignee: A.K. Technical Laboratory, Inc., Nagano-ken (JP)

( * ) Notice: Subject to any disclaimer, the term of this patent is extended or adjusted under 35 U.S.C. 154(b) by 379 days.

(21) Appl. No.: 10/789,930

(22) Filed: Feb. 27, 2004

(65) Prior Publication Data

US 2004/0219254 A1    Nov. 4, 2004

(30) Foreign Application Priority Data

Feb. 28, 2003  (JP)  ............... 2003-053856

(51) Int. Cl.
  B29C 49/56   (2006.01)
  B29C 49/12   (2006.01)
(52) U.S. Cl. ............... 425/529; 425/535; 425/540; 425/541
(58) Field of Classification Search ............... 425/529, 425/535, 540, 541
  See application file for complete search history.

(56) References Cited

U.S. PATENT DOCUMENTS 4,427,359 A * 1/1984 Fukuoka et al. ............ 425/529
6,217,819 B1 * 4/2001 Wunderlich ................. 425/529
6,726,466 B1 * 4/2004 Priest ......................... 425/541

FOREIGN PATENT DOCUMENTS

JP        06-218802       8/1994

* cited by examiner

Primary Examiner—Robert B. Davis
(74) Attorney, Agent, or Firm—Weingarten, Schurgin, Gagnebin & Lebovici LLP

(57) ABSTRACT

The present invention provides a blow molding machine comprising a plurality of pillars 5 set up facing on a seat 4 above a base 3 located above a blow mold 2; a stationary platen 6 provided bridging on the top portions of the pillars 5; a moving cylinder 7 set on both side of the stationary platen 6; and a holding plate 9 of blow-core members, which is connected with a piston rod 7a of the moving cylinder 7, and in which the pillars 5 are inserted vertically movable; and a clamp plate 15 projecting at both ends from the holding plate 9 outwardly, and a clamp block 16, which includes internally a pair of hydraulic cylinders 18 to clamp the clamp plate 15 from both sides with rams when the holding plate 9 is in the lower limit position, which is provided on both sides of the seat 4.

2 Claims, 5 Drawing Sheets ns machine to
produce a hollow product such as a bottle by means of an air
blow via a preform which is made by injection molding.

BLOW MOLDING MACHINE

This application claims priority to a Japanese patent application No. 2003-053856 filed Feb. 28, 2003.

FIELD OF THE INVENTION

The present invention relates to a molding machine to produce a hollow product such as a bottle by means of an air blow via a preform which is made by injection molding.

BACKGROUND OF THE INVENTION

In the conventional molding machine of this type, in order to prevent a blow-core member, which is fitted airtightly into the mouth portion of a perform in a mold, from leaking caused by floating by the pressure of air blow, a moving block fixed with the blow-core member is applied to lock for locating by a locking device. (e.g. reference patent 1: Japanese Patent Publication No. 06-218802 (Page 1, FIG. 1)).

According to the locking device in the reference patent 1, a stationary block set up on a base is locked with a moving block of the internal vertically movable blow-core member by fitting of an air-driven locking pin and locking hole. However, the problem to be solved is that locking by fitting a locking pin into a pin hole is not suitable for the conventional blow molding machine, in which the vertically movable holding plate of the blow core member is supported on pillars set up on the base as in the reference patent 1, since there is no stationary block and moving block equipped for the locking device.

Also, according to the device in the reference patent 1, because the stroke of the locking pin is long, the air blow which must be followed after the lock state is detected at the position of locking pin, and moving of the core upwardly after molding must be done after confirmation of unlock state. This results an inconvenience as locking and unlocking require unexpected time, which causes a delay of dry cycle time in the molding machine.

Moreover, in the method of locking by the locking pin and the pin hole, the holding force applied by the mean for moving the blow-core member from above to hold the blow-core member is received by the locking pin on both sides at the lower limit position of the movable block, so that the holding force given by the mean for moving the blow-core member is transmitted insufficiently to the holding plate of the blow-core member, and lack of the holding force often results a leak of blow air.

Also, during the blow molding process, as the locking pin receives the force of the blow pressure, stronger than the holding force, after the molding is operated for a long period of time, the neck portion between the pin and the piston is damaged by inclining the axis of the locking pin upwardly caused by the force of the blow pressure given repeatedly, and the blow-core member is easily lifted up for the increase of the clearance caused by the abrasion on the hole wall because of the friction on the internal wall of the pin hole.

Normally, since tight fitting between the tip portion of the blow-core member and a neck mold that holds the mouth portion of the preform is kept by fitting of the tapered surface. Even if the blow-core member moves very slight to the draw direction by floating, it causes looseness in fit and the tightness. Therefore, the air leaks from the neck mold, and this makes a drop of the blow air pressure, which becomes a cause of defects in molding. For this reason, increase of the clearance caused by the abrasion on the inside wall of the pin hole is not allowable, and the fit must be performed with a minimum clearance, so that another problem to be solved is that the locking device requires a high degree of accuracy and durability even for such a simple device.

SUMMARY OF THE INVENTION

The present invention relates to solve the above mentioned conventional problem wherein the purpose is to provide the new blow molding machine in which by an adoption of clamping means that clamp the holding plate of the blow-core member, the fixation and release of the holding plate become more quick and secure compared to the locking by using locking pin assembly, reduction of holding force of mean for moving the blow-core member does not occur, and the confirmation of clamping by a detector is not necessary.

The present invention relates to a blow molding machine comprising a plurality of pillars set up facing on a seat on a base located above a blow mold;

a stationary platen provided bridging on the top portions of the pillars;

a moving cylinder set on both side of the stationary platen; and a holding plate of blow-core members, which is connected with a piston rod of the moving cylinder, and in which the pillars are inserted vertically movable;

and a clamp plate projecting at both ends from the holding plate outwardly, and a clamp block, which includes internally a pair of hydraulic cylinders to clamp the clamp plate from both sides with rams when the holding plate is in the lower limit position, which is provided on both sides of the seat.

In the present invention, a movable platen provided under the stationary platen is connected to the above mentioned piston rod, and a tie rod, which is set lengthways under the movable platen, is connected to the above mentioned holding plate, and a set plate of stretch rod is kept vertically movable by the tie rod, which is inserted through the set plate, and the set plate is connected to a plunger of a stretch driving means which is provided to the movable platen longitudinally in the center.

DETAILED DESCRIPTION OF THE PREFERRED EMBODIMENT

Figure 1:
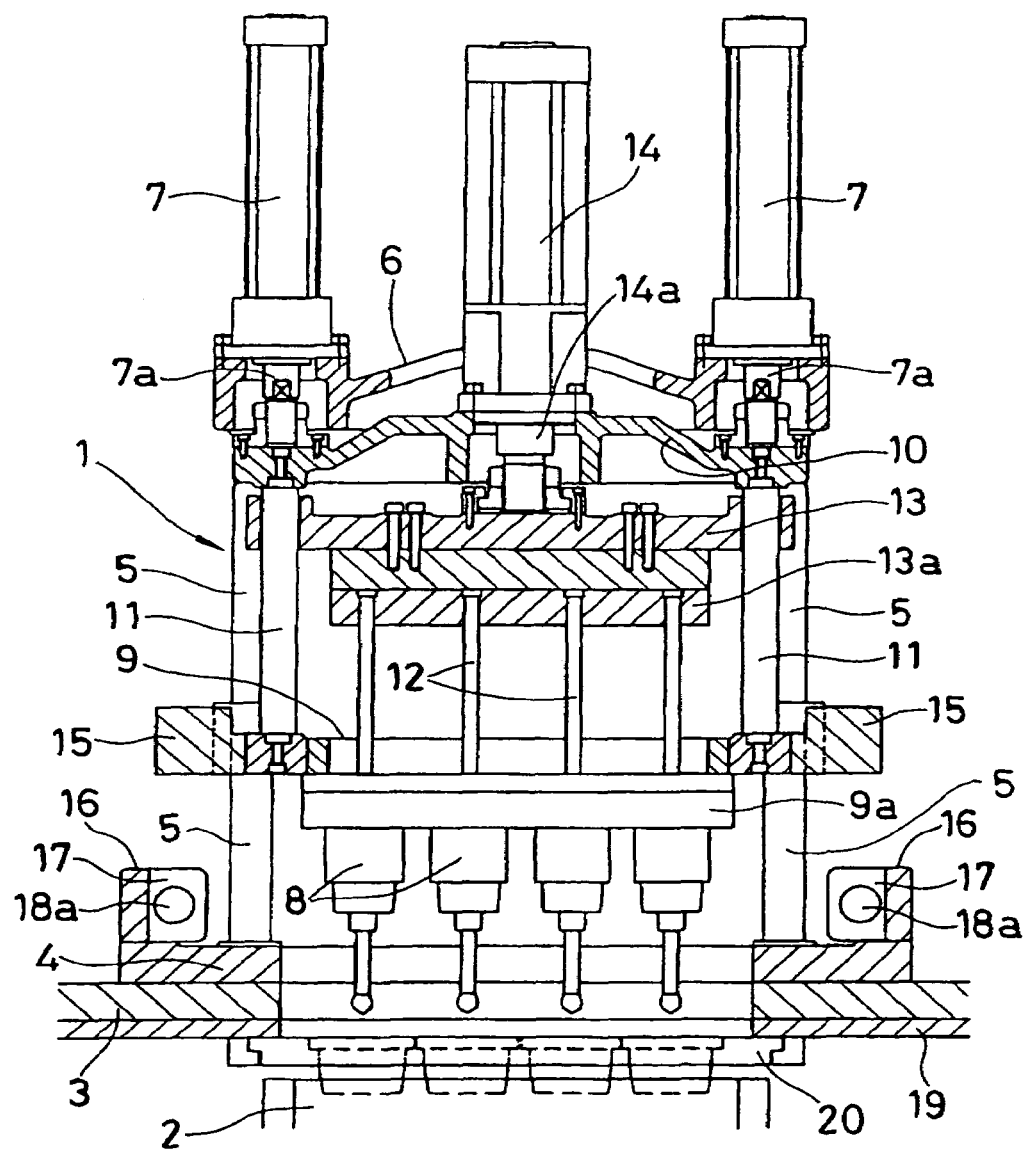
FIG. 1 is a transverse front sectional view of the blow molding machine before the operation according to the present invention.

In the Figures, a reference numeral 1 shows the blow molding machine having stretch means which is set up on a base 3, vertically movable and located above the blow mold 2. The blow molding machine 1 comprises the four pillars 5,5, which are provided facing a pair bilaterally on the seat 4 fixed on the base, the frame shape stationary platen 6 provided bridging on the top portion of the pillars, the air or hydraulic driven movable cylinders 7,7, which are longitudinally set between a pair of pillars located at both sides of the stationary platen 6, and the holding plate 9 of the blow-core member 8, in which the pillars 5,5 are inserted vertically and which is movable and connected to the piston rods 7a of each movable cylinders 7.

The movable platen 10 is provided under the stationary platen 6. The both sides of the movable platen 10 are connected to the piston rod 7a, 7a. Tie rods 11,11 are provided under the movable platen 10. The holding platen 9 is connected to the tie rods 11,11. The tie rods 11,11 are inserted through the set plate 13 of the stretch rods 12 vertically movable. The plunger 14a of the stretch driving device 14 which is provided in the center of the movable platen 10 longitudinally is connected to the set plate 13.

The blow-core member 8 is set downwardly under the holding member 9 by the joint plate 9a. The stretch rods 12 are set downwardly under the set plate 13 by the joint plate 13a. The numbers of the blow core member and the stretch rod 12 are equal to cavities in the blow mold. The stretch rods 12 are inserted through the blow core members 8. On both ends of the holding plate 9, the clamp plates 15,15 are projected integrally.

The clamp blocks 16,16 are provided integrally on both ends of the above mentioned seat 4 in order to clamp the above mentioned clamp plates 15,15. The clamp blocks 16 include the inserting grooves 17 vertically in the center of the clamp blocks 16, wherein the clamp plates 15 come into the inserting grooves at the lower limit position of the holding plate 9. The clamp block 16 also includes a pair of hydraulic cylinders 18,18 having the rams 18a movable inside provided on both sides of the inserting grooves 17 facing toward each other. The width of the inserting grooves 17 should be only wide enough not to disturb the movement of the clamp plate 15. The clearance between the side surface of the clamp plate 15 and the tip portion of ram 18a may be small but enough to keep the clamp plate 15 not to contact with the front ends of the rams 18a during the movement of the clamp plate 15 (e.g. 1 mm).

In the above construction of the blow molding machine 1, after the preform (not shown) kept in the neck mold 20 is transferred by the transfer platen 19 provided under the above mentioned base 3 to the center position of the blow mold 2 which is opened, the preform moves downward into the mold 2 with the base 3, and the blow mold 2 and neck mold 20 are closed.

Figure 2:
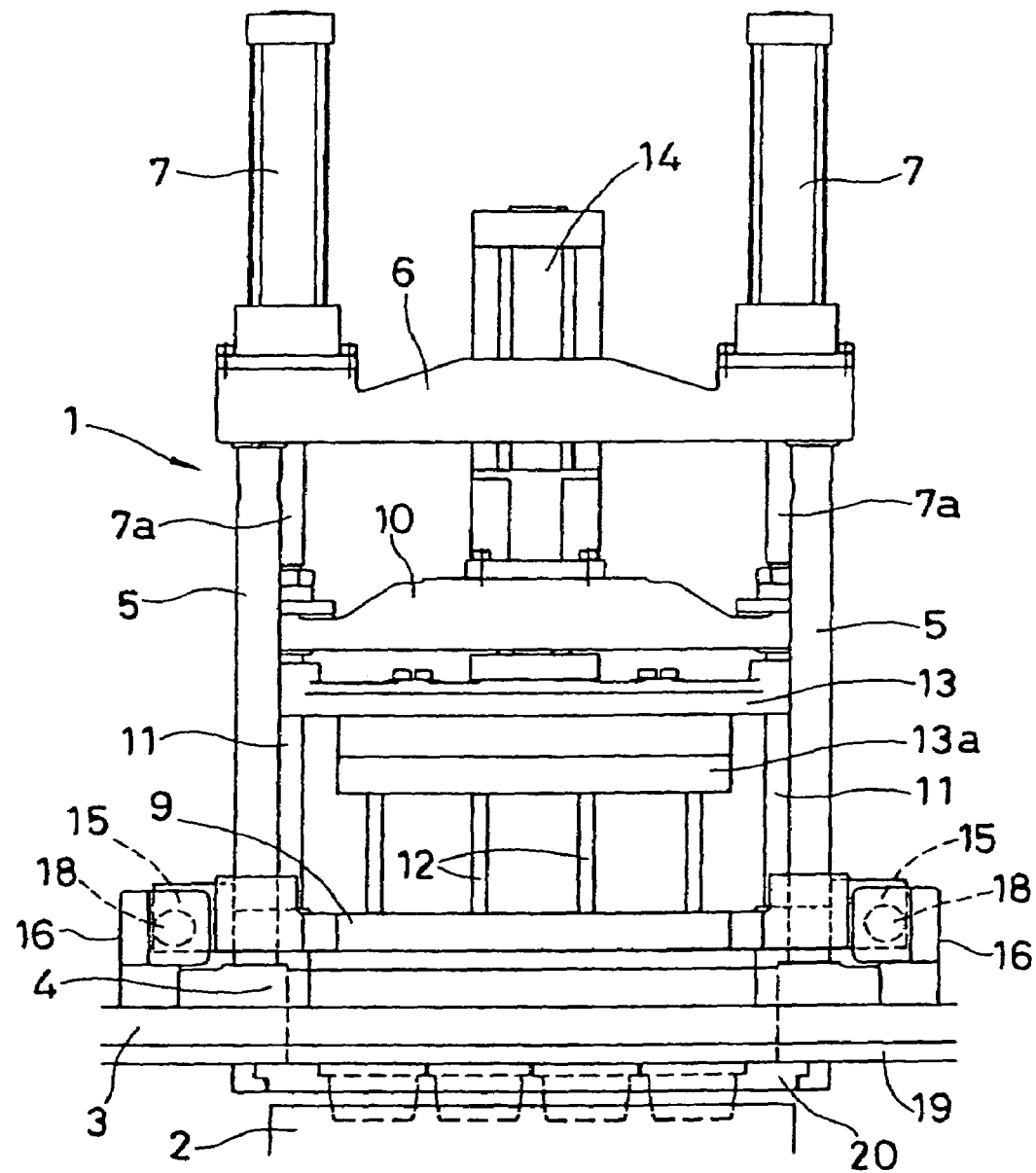
FIG. 2 is a front view of the blow molding machine in the operation according to the present invention.
Figure 3:
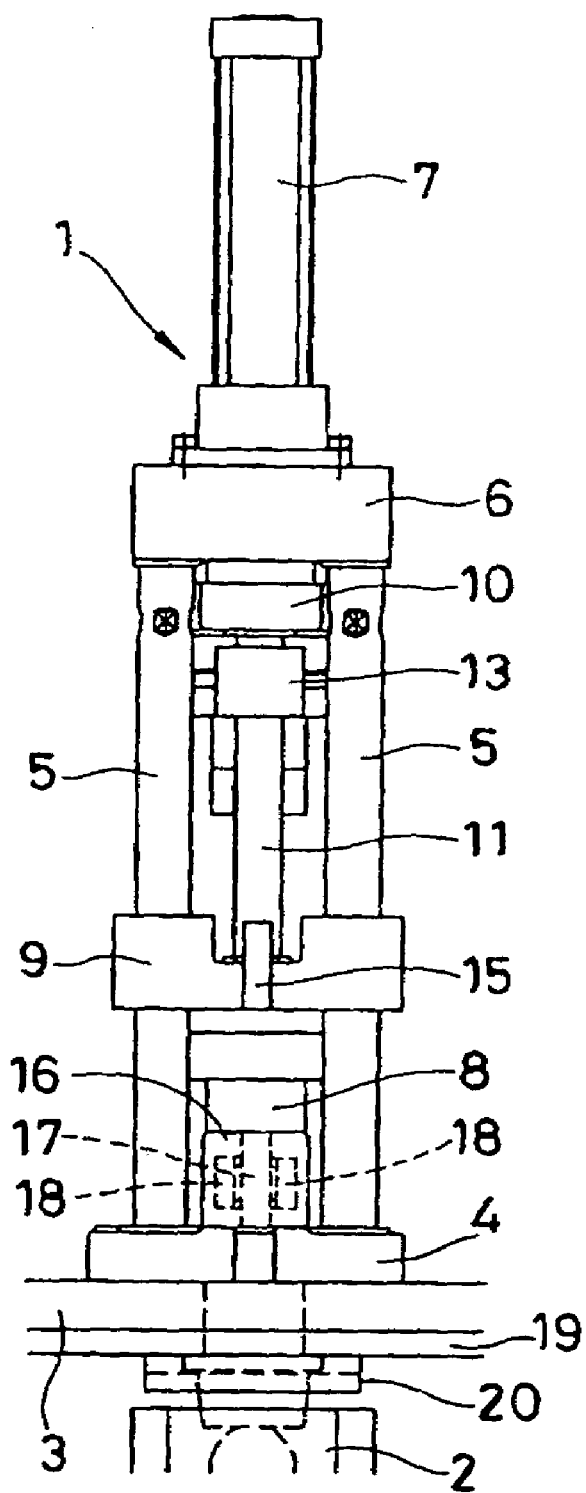
FIG. 3 is a side view of the blow molding machine before the operation according to the present invention.
Figure 4:
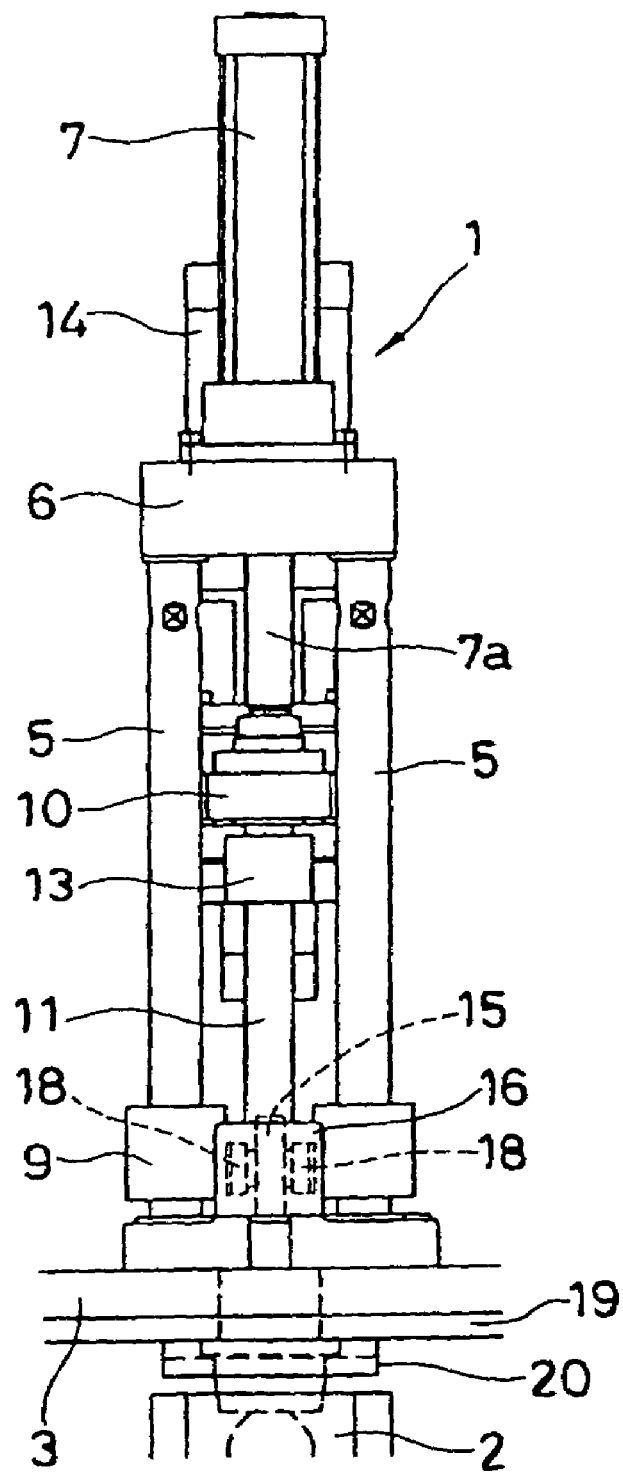
FIG. 4 is a side view of the blow molding machine in the operation according to the present invention.
Figure 5:
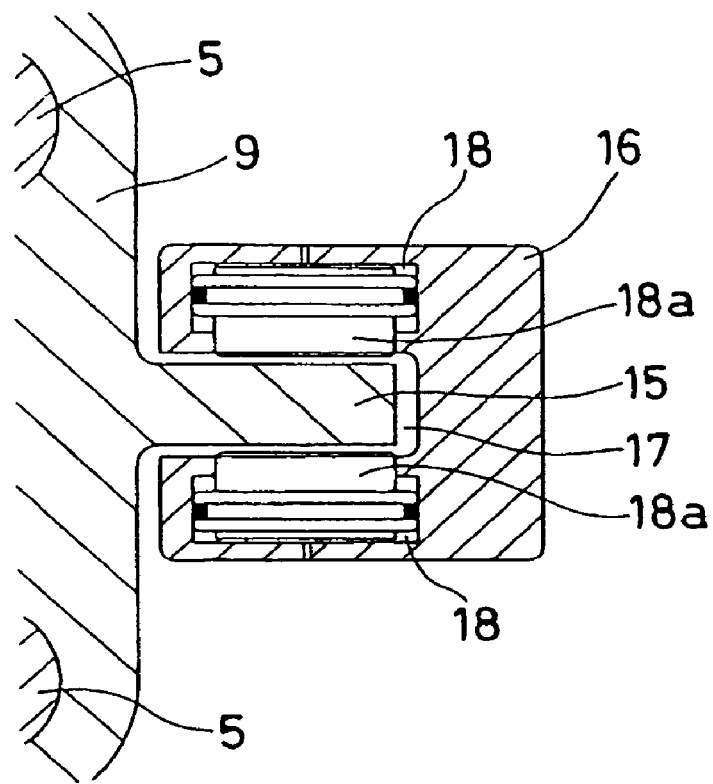
FIG. 5 is a sectional view of a clamp block at the time of insertion of a clamp plate.
Figure 6:
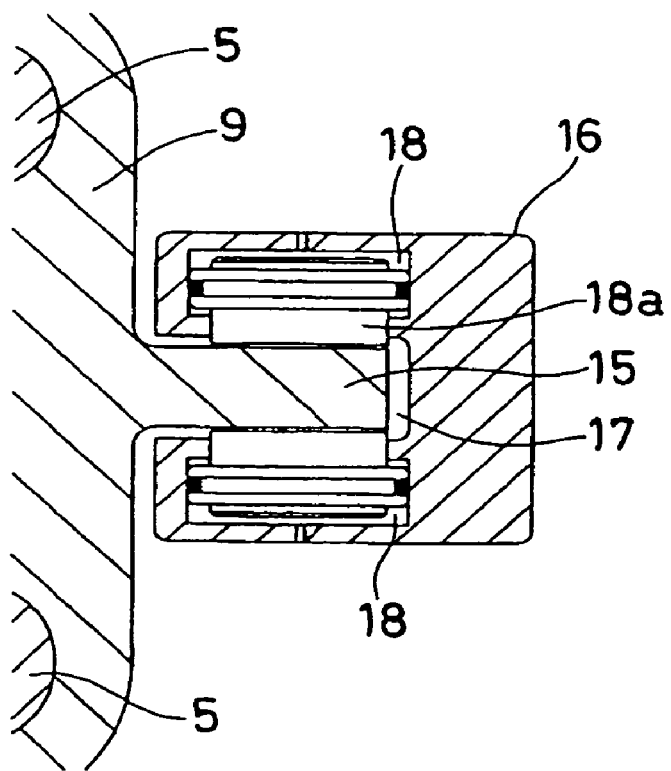
FIG. 6 is a sectional view of a clamp block at in the operation.

After the mold is closed, when the above mentioned moving cylinder 7 is actuated, as shown in the FIGS. 2, 3, and 4, the piston rods 7a connected to movable platen 10 moves downward, the movable platen 10 and the holding plate 9, which is connected with the lower tip of the tie rod 11, also moves downward to the lower limit position, therein the stretch rods 12 are inserted into the preform and the blow core members 8,8 fit airtightly with the neck mold 20. The blow core members 8,8 are pressed against inside of the neck mold 20 to keep airtightness by the holding force of the moving cylinders 7,7 applied to the holding plate 9.

As the holding plate 9 moves downward to the near position of the lower limit, the clamp plates 15,15 provided at both ends of the holding plate 9 get into the inserting grooves 17, 17 of the clamp blocks 16,16 which are located directly below from upward. When the holding plate 9 comes to the lower limit position by approaching to the base 3, the clamp plates 15,15 stops in the inserting grooves 17 of the clamp blocks 16, 16.

Immediately after stop is confirmed by any method, the hydraulic pressure is applied to move the hydraulic cylinders 18,18, and the rams 18a, 18a are projected into the grooves 17 and then the both of the surface of clamp plates 15,15 are clamped. Accordingly, the clamp plate 9 is fixed and held at the lower limit position by the moving cylinders 7,7 so that the fitting of blow core members 8,8 and the inside of the neck mold 20,20 become to be kept airtight.

When the hydraulic pressure is applied to the hydraulic cylinders 18,18 to advance forward, instantaneously the rams 18a, 18a run firmly into the both sides of the surfaces of the clamp plates 15, 15, and since the rams 18a, 18a only advance forward by the clearance between the clamp plates, clamping instantaneously completes and maintains clamping by the predetermined pressure. Accordingly, without the need for confirmation of clamping, the stretch blow process can be proceeded immediately after the forward actuation of the hydraulic cylinders 18, 18.

Also, since clamping of the holding plate 9 is made by the holding force applied to the side surfaces of the clamp plates 15,15, clamping is not obstructive to actuate the holding force of the vertical direction by the moving cylinder 7, 7 located above. Therefore, clamping of the present invention can cope with the pressure of a blow air by using lower holding force than the conventional.

After fitting of the blow core members 8, 8 with the neck mold 20 and insertion of the stretch rods 12, 12 to the blow core member 8, 8 are completed, the above mentioned stretch driving means 14 is actuated to extend the plunger 14a and pushes down the stretch rods 12 with the set plate 13 together, and the preform is stretched to the longitudinal direction. Simultaneously, the blow air is forced into the preform from an air circuit, which is not shown, of the blow core member 8 so that the preform is molded to a hollow vessel like a bottle by the stretch blow molding process. On this occasion, the pressure of the blow air to the blow core members 8,8 is capable to be held by the holding force of the moving cylinders 7,7 and the clamping force applied to the clamp plates 15,15 by the hydraulic cylinders 18,18.

After the completion of molding bottle, the mold release of a bottle is started by opening the blow mold 2 and by moving the base 3 upward. During the mold release process the hydraulic pressure is applied to the hydraulic cylinders 18, 18 for retracting the rams 18a, 18a. Accordingly, both rams 18a, 18a move backward instantaneously to be separated from the clamp plate 15,15 securely, and the holding plate 9 becomes unclamped. Accordingly, the confirmation of unclamping is not necessary for proceeding to the next step, so that the moving cylinders 7,7 are converted immediately from holding to upward movement, and the holding plate 9 with the blow core members 8,8 is able to be restored to the original position by raising. Accordingly, the time required for releasing the holding plate 9 becomes extremely short and a high speed of the dry cycle time can be accomplished as well as the shortage of the time required for clamping.

What is claimed is:

1. A blow molding machine comprising
a plurality of pillars set up facing on a seat on a base located above a blow mold;
a stationary platen provided bridging on the top portions of the pillars;
a moving cylinder set on both sides of the stationary platen; and a holding plate of blow-core members, which is connected with a piston rod of the moving cylinder, and in which the pillars are inserted vertically movable;

and a clamp plate projecting at both ends from the holding plate outwardly, and a clamp block, which includes internally a pair of hydraulic cylinders to clamp the clamp plate from both sides with rams when the holding plate is in the lower limit position, which is provided on both sides of the seat.

2. The blow molding machine of claim 1, wherein a movable platen provided under the stationary platen is connected to the piston rod, and a tie rod, which is set lengthways under the movable platen, is connected to the holding plate, and a set plate for a stretch rod is kept vertically movable by the tie rod, which is inserted through the set plate, and the set plate is connected to a plunger of a stretch driving means which is provided to the movable platen longitudinally in the center.

* * * * *